(12) United States Patent
Epshetsky et al.

(10) Patent No.: US 8,534,917 B2
(45) Date of Patent: Sep. 17, 2013

(54) LINEAR BEARING ASSEMBLY AND METHOD

(75) Inventors: Yefim Epshetsky, Schaumburg, IL (US); Mathew Peter Rosauer, Algonquin, IL (US); Andrew Walter Helns, Elgin, IL (US); Richard Mclean Stilfield, Elgin, IL (US); Lien Pham Stilfield, legal representative, Elgin, IL (US)

(73) Assignee: Aktiebolaget SKF, Göteborg (SE)

( * ) Notice: Subject to any disclaimer, the term of this patent is extended or adjusted under 35 U.S.C. 154(b) by 125 days.

(21) Appl. No.: 12/964,259

(22) Filed: Dec. 9, 2010

(65) Prior Publication Data
US 2012/0148177 A1     Jun. 14, 2012

(51) Int. Cl.
*F16C 17/00* (2006.01)
*F16C 33/10* (2006.01)
*F16C 35/00* (2006.01)
*F16C 19/00* (2006.01)

(52) U.S. Cl.
USPC ............. 384/9; 384/13; 384/24; 384/57

(58) Field of Classification Search
USPC ............. 384/7, 8, 9, 12, 13, 24, 26, 42, 43, 384/44, 45, 47, 53, 57
See application file for complete search history.

(56) References Cited

U.S. PATENT DOCUMENTS

| | | | | |
|---|---|---|---|---|
| 4,941,197 A | * | 7/1990 | Roeser | 384/44 |
| 5,374,125 A | * | 12/1994 | McMurtry et al. | 384/9 |
| 5,649,768 A | * | 7/1997 | Ohzono et al. | 384/43 |
| 7,223,018 B2 | * | 5/2007 | Kanehira | 384/9 |
| 2011/0170808 A1 | * | 7/2011 | Chen | 384/13 |

FOREIGN PATENT DOCUMENTS

JP         05172138 A  *  7/1993

* cited by examiner

*Primary Examiner* — Thomas R Hannon
*Assistant Examiner* — Adam D Rodgers
(74) *Attorney, Agent, or Firm* — Inventa Capital PLC

(57) ABSTRACT

A linear bearing assembly (the assembly) of the present invention is disposed in a housing of the assembly. A first rail and a second rail are movable relative to one another. A plurality of linear bearings are connected to the housing and disposed about the first and second rails. An actuator device is connected to at least one of the first rail and the second rail to selectively move the first rail and the second rail relative to one another and the housing in at least one of simultaneous and separate modes to redistribute lubricant in the linear bearings thereby preventing deformation of at least one of the first rail and the second rail.

13 Claims, 3 Drawing Sheets

LINEAR BEARING ASSEMBLY AND METHOD

FIELD OF THE INVENTION

The present invention relates generally to a linear bearing assembly and method of forming the same.

BACKGROUND OF THE INVENTION

Conventional linear bearing systems are widely used in various industrial applications that require motion between at least two parts. The linear bearing system typically includes an axially extending guide rail having rolling grooves in outer surfaces and a slider mounted over the guide rail. The slider includes a slider body and an end cap fitted at both ends of the slider body. The slider includes rolling elements disposed therein. The rolling elements, such as, for example, steel balls, are loaded in the circuits. Before an object connected to or supported by the slider can move, force has to be applied to the object until the resisting force due to static friction is overcome. This static friction is also called "stiction".

Once the object starts moving, the resisting force drops to a lower level dynamic friction force due to friction. The sudden reduction in the resisting frictional force causes the object to accelerate rapidly or "jump". This jumping action prevents the smooth acceleration of the object from other components operably connected with one another thereby presenting problems for moving the object a small distance as it tends to jump past the intended stopping point.

In the linear bearing systems that are heavily loaded but remain stationary for long periods of time, there is the possibility of the bearings being damaged by "false brinelling", a condition where the load on a stationary rolling element is large enough to cause the element, over time, to permanently deform (dent) the race surface. As appreciated by those skilled in metal arts, "false brinelling" is damage caused by fretting, which causes imprints. These imprints look similar to "brinelling" thereby resulting in permanent material deformation. The basic cause of "false brinelling" is a lubricant, which is pushed out of a loaded region. Without the lubricant, wear is increased and the resulting wear debris may oxidize and form an abrasive compound, which further accelerates wear. In normal operation, a rolling-element bearing has the rollers and races separated by a thin layer of the lubricant, i.e. grease or oil. Although these lubricants normally appear liquid, under high pressure they act as solids and keep the bearings and the race from contacting one another.

If the lubricant is removed, the bearings and the races can contact directly. While bearings and races appear smooth to the eye, they are microscopically rough. The bearing load is thus spread over much less area increasing the contact stress, causing pieces of each surface to break off or to become pressure-welded then break off when the bearing rolls on. One method of preventing "false brinelling" is to move the object, or rotate the shaft, periodically, which is inconvenient or even impossible in certain application thereby resulting in total replacement of the bearing assembly.

There are numerous other prior art methods of static friction reduction in linear bearing applications. One of such methods is used in a pressurized air bearing applications. In the air bearing application, compressed air lifts the object from the bearing surface so the only friction is between a gas and the bearing surfaces. Such method requires a very flat, clean, and smooth surface, a source of clean dry compressed air, seals to keep the gas from escaping. If the air supply is stopped while the object is in motion, the bearing is usually damaged and has to be replaced.

Another method is used in a pressurized oil bearing application. Such method also requires a very flat, clean, and smooth surface, a source of clean oil, seals to keep the oil from escaping. The friction between the oil and the bearing surface is higher than with an air bearing and results in the bearing being damaged and subject to be replaced.

The art is replete with various methods and designs aimed to lubricate the sliders as the sliders move along the rails in linear bearing systems. One of such prior art patent is U.S. Pat. No. 5,678,927 to Yabe, et al., which teaches a linear guide apparatus including a guide rail, a slider fitted movably to the guide rail, a plurality of rolling elements loaded to move the slider relative to the guide rail. A seal device is mounted on a side of the slider to seal a clearance existing between the guide rail and the slider, the seal device includes a lubricant-containing polymer member that is fitted into the recess and has an inner sealing portion slidably contacting the guide rail and an outer surface opposed to the inner sealing portion and positioned at a predetermined clearance relative to the recess.

U.S. Pat. No. 5,678,927 does not teach a system or method that prevents "false brinelling". Should the linear guide apparatus be subject to "false brinelling", the apparatus or at least some of the components will need to be replaced, which is not cost effective and may require to stop or delay manufacturing process of industrial application wherein the linear guide apparatus is used.

Another prior art reference, U.S. Patent Application Publication No. 2004/0234176 to Sattler et al., discloses another design of a linear rolling bearing element comprising a carrier body that is mounted through rolling elements for sliding on the running surface of a guide rail, and, for forming a rolling element circuit, a load-bearing zone and a return channel, which extends parallel to the direction of movement of the linear rolling bearing element. The load-bearing zone and the return channel are connected to each other through deflecting channels that are arranged on the carrier body in frontally adjoining head pieces that contain lubricant ducts starting at a filling point of each head piece and leading to the rolling elements.

Similar to the U.S. Pat. No. 5,678,927, the Sattler et al. reference does not teach a system or method that prevents "false brinelling". The linear rolling bearing element does not allow redistribution of lubricant in bearings that remain static for long periods of time. Should the linear rolling bearing element be subject to "false brinelling", at least some of the components of the linear rolling bearing element will need to be replaced, which is not cost effective and may require to stop or delay manufacturing process of industrial application wherein the linear rolling bearing element is used.

Hence, there is a need for an improved linear bearing assembly and methods that will prevent "false brinelling" and provide for improved redistribution of lubricant in bearings that remain static for long periods of time. The inventive concept as set forth further below improves the aforementioned prior art systems and methods.

SUMMARY OF THE INVENTION

A linear bearing assembly (the assembly) of the present invention has numerous applications including and not limited to applications that require excessive and repetitive linear motions, i.e. "pick and place" robotic, applications, various testing devices and the like. The assembly illustrated and described herewith is not intended to limit the scope of the present invention and is depicted to disclose concept as applicable to all of the aforementioned applications.

The assembly includes a housing presenting a support surface or base having a pair of walls extending upwardly therefrom. A rail device is positioned within the housing and is supported by the base. The rail device includes a rail, a pair of lower bearing units and a pair of upper bearing units. The upper and lower bearing units are linear bearing units. The lower bearing units are rigidly connected to the base and are adjacent to one another. The upper bearing units are rigidly connected to a railing member slidable movable relative to the rail. A shaft is connected to the railing member. The shaft is operably communicated with a piece of equipment such as the testing machine or any other industrial application that requires linear activation.

A pair of limiters are disposed in the walls and extend therethrough to control distance of travel of the railing member thereby preventing the railing member to move beyond predetermined distance of travel. A pair of actuators are connected to at least one of the walls. One of the actuators is connected to the railing member and the other actuator is connected to the rail. The actuators are used to facilitated linear movement of the rail and the railing member relative to one another or each of the rail and railing member separately.

A controller is electronically or wirelessly communicated with the actuators. A software of the controller is programmed to send signals to the actuator thereby moving the rail and the railing member either simultaneously or separately from one another thereby preventing the bearings from being damaged by "false brinelling", a condition where the load on a stationary rolling element is large enough to cause the element, over time, to permanently deform (dent) the race surface.

An advantage of the present invention is to provide a system and method to reduce the static friction or "stiction" in a linear or roller bearings.

Another advantage of the present invention is to provide a system and method can also be used with small amplitude reciprocating motions to prevent lubrication starvation and localized race wear in different bearing applications.

Still another advantage of the present invention is to provide a system and method to alter bearing element accelerations thereby reducing lubrication starvation or ball/roller skidding during motion.

Yet another advantage of the present invention is to provide a system and method to prevent "false brinelling" and to ensure redistribution of lubricant in bearings that remain static for long periods of time.

Other advantages and meritorious features of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
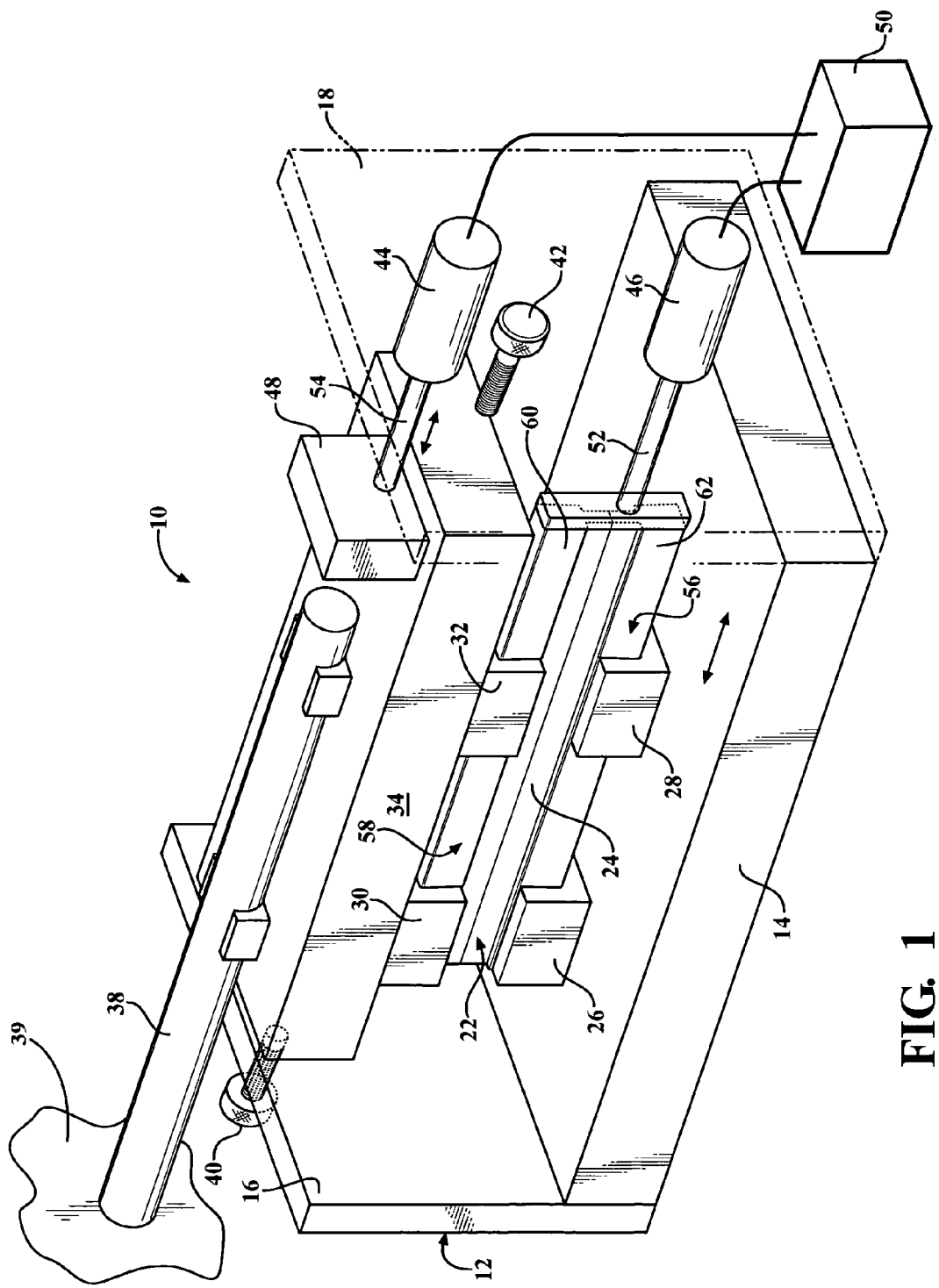
FIG. 1 illustrates a perspective view of a liner bearing assembly of the present invention.
Figure 2:
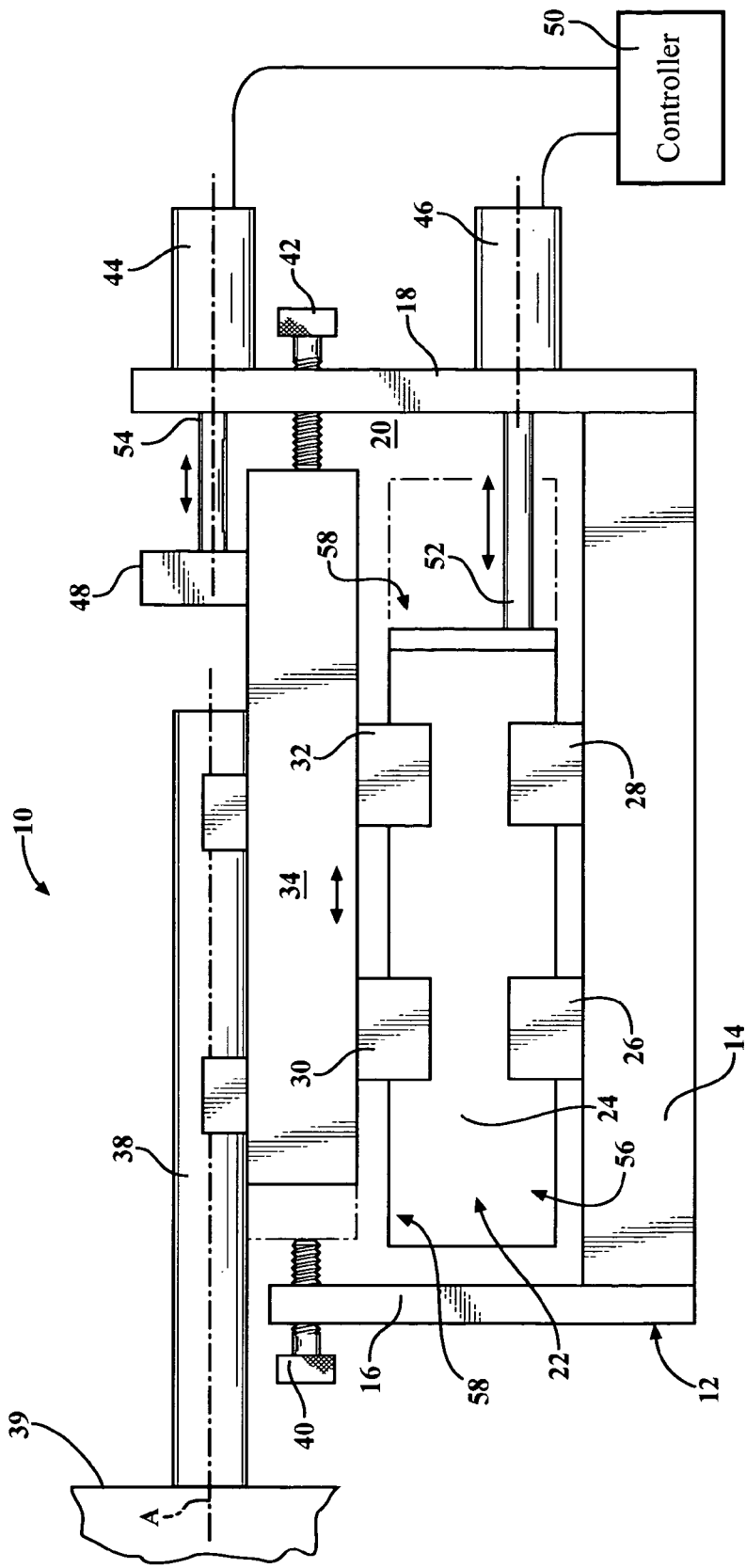
FIG. 2 illustrates a cross sectional view of the linear bearing assembly of FIG. 1; and FIG. illustrates another cross sectional view of the linear bearing assembly of FIG. 1.
Figure 3:
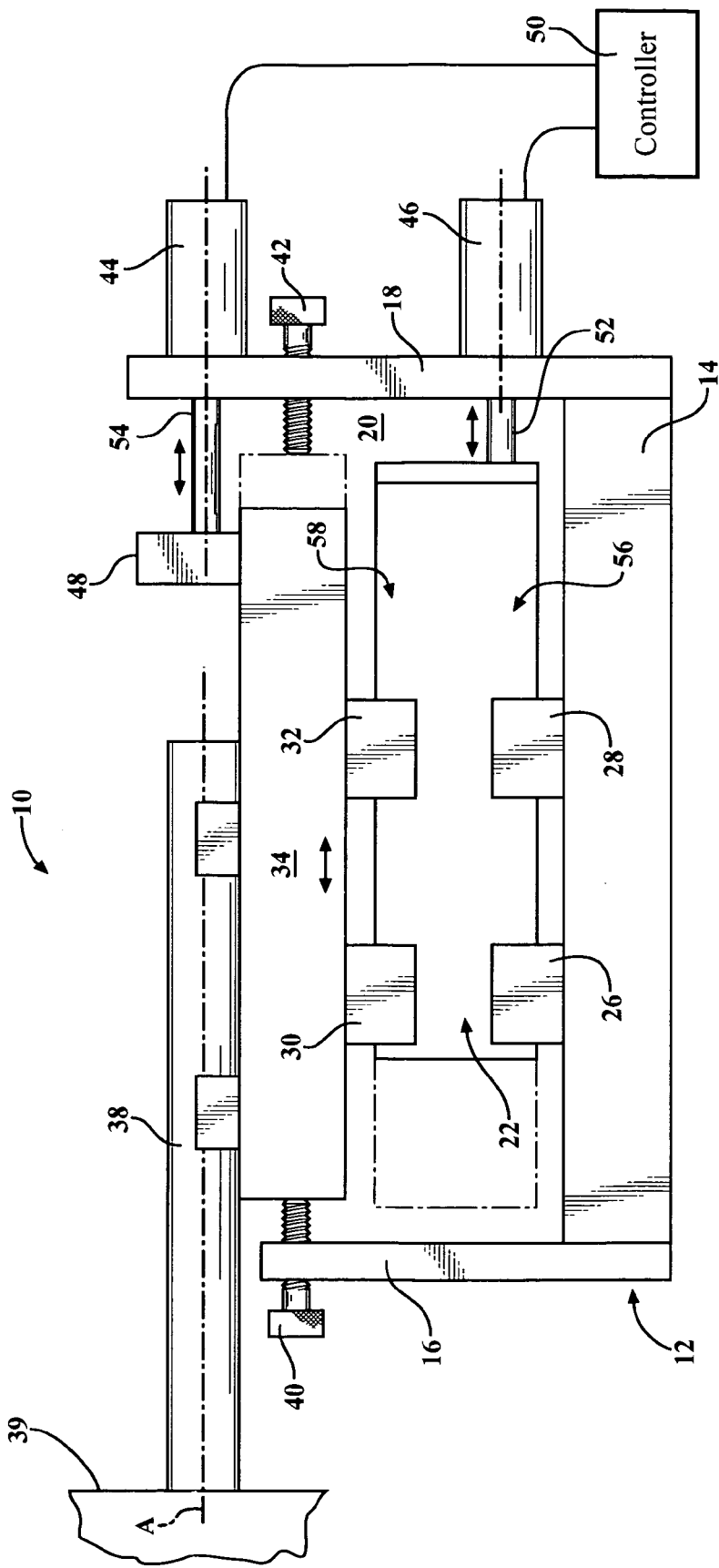

Referring to the Figures, wherein like numerals indicate like or corresponding parts throughout the several views, a linear bearing assembly (the assembly) of the present invention is generally shown at 10 in FIGS. 1-3. The assembly 10 has numerous applications including and not limited to applications that require excessive and repetitive linear motions, i.e. "pick and place" robotic, applications, various testing devices and the like. The assembly 10 illustrated and described herewith is not intended to limit the scope of the present invention and is depicted to disclose concept as applicable to all of the aforementioned applications.

The assembly 10 includes a housing, generally indicated at 12 presenting a support surface or base 14 having a pair of walls 16, 18 extending upwardly therefrom to form a chamber 20. A rail device, generally indicated at 22, is positioned within the chamber 20 and is supported by the base 14. The rail device 22 includes a rail 24, a pair of lower bearing units 26, 28 and a pair of upper bearing units 30, 32. The upper and lower bearing units 26, 28, 30, and 32 are linear bearing units. The lower bearing units 26, 28 are rigidly connected to the base 14 and are adjacent to one another. The upper bearing units 30, 32 are rigidly connected to a railing member 34 slidable movable relative to the rail 24.

A shaft 38 is connected to the railing member 34. The shaft 38 is operably communicated with an object, i.e. a piece of equipment such as the testing machine 39 or any other industrial application (not shown) that requires linear activation and without limiting the scope of the present invention.

A pair of limiters 40 and 42 are disposed in the walls 16 and 18 and extend therethrough to control distance of travel of the railing member 34 thereby preventing the railing member 34 to move beyond predetermined distance of travel. A pair of actuators 44 and 46 are connected to at least one of the walls 18. Those skilled in actuator art will appreciate that a single actuator may be used with the inventive concept. Number and type of the actuators is not intended to limit the scope of the present invention. The actuators 44 and 46 may be mechanical, pneumatic, and hydraulic without limited the scope of the present invention. One of the actuators 44 is connected to the railing member 34 and the other actuator 46 is connected to the rail device 22. The actuator 44 is connected to a segment 48 extending from the railing member 34. Alternatively, the actuator 44 may be connected directly to the railing member 34 without limiting the scope of the present invention. The actuators 44 and 46 are used to facilitated linear movement of the rail device 22 and the railing member 34 relative to one another or each of the rail device 22 and railing member 34 separately from one another.

A controller 50 is electronically (either directly or wirelessly) communicated with the actuators 44 and 46. The controller 50 is programmed to send signals to the actuators 44 and 46 thereby moving the rail device 22 and the railing member 34 in simultaneous and separate modes to redistribute lubricant in the linear bearings 26, 28, 30, and 32 to prevent deformation of the rail device 22 and the railing member 34.

Referring again to FIG. 1, the rail device 22 includes a rail 24 that can present a monolithic construction (not shown) or be defined by a pair of separate rails, generally indicated at 56 and 58 and having race surfaces 60 and 62, respectively. Each of the rails 56 and 58 is connected to one another to expose the race surfaces 60 and 62 in opposite directions. In operation mode, one of the race surfaces 60 is slidably movable about and within the linear bearings 30 and 32 and the other race surface 62 is movable about and within the linear bearings 26 and 28 as shafts 52 and 54 of the respective actuators 46 and 44 move the rail device 22 and the rail member 34 relative to one another as best shown in phantom lines in FIGS. 2 and 3.

Alluding to the above, the inventive assembly 10 reduces the static friction by initiating motion in the bearing elements, i.e. linear bearings 26, 28, 30, and 32 before force is applied to the object. This is done by having an intermediate element (not shown) in the bearing arrangement start moving a short time before the object motion is initiated. In the case of the linear bearing where an object is to be moved with reference to a machine frame, there is a bearing block, such as the rail member 34, attached to the object (not shown). The bearing block rides on the rail device 22. There is also a means of applying a force to the object, such as an electro-magnet or linear induction coil (linear motor) (not shown).

When motion of the object is required, the rail device 22 is moved at a constant velocity for a short time before the object motion is initiated. When the rail device 22 is moved, there will be stiction that must be overcome between both linear bearings 26, 28, 30, and 32 and the rail device 22. After the rail motion starts, the linear bearings 26, 28, 30, and 32 are now in a dynamic condition and the force to move the object will be reduced. The force is now applied to the object and it begins to move. The rail motion can be stopped by a signal through the controller 50. The force required to keep the load moving is still at the lower force to overcome dynamic friction. Just prior to stopping the object, the motion of the rail device 22 can again be initiated. This will keep the object moving with dynamic friction as it settles to its final position.

When an object is stopped at a position using an induction coil or linear motor (not shown), there tends to be a positional overshoot. The object's direction must be reversed to move it back to the target position. While the object's direction is reversing, it will come to rest momentarily, the static friction then must be overcome to move the object to its target position. This force can be great enough to cause the object to jump past its target position. This overshoot can perpetuate itself as the assembly 10 attempts to bring the object to its target position, thereby leading to long settling times in the assembly with large masses and fast motions.

In systems where the bearing elements are subject to small amplitude reciprocating motions the rolling elements tend to become starved for lubrication and they will locally wear the bearing races, like the race surfaces 60 and 62. By moving the rail device 22 at a distance large enough to cause the rolling elements of the linear bearings 26, 28, 30, and 32 to make several complete revolutions, lubrication will be restored and the elements and the race surfaces 60 and 62 will wear more evenly. This motion can be done each cycle or on regular intervals, as preprogrammed by the controller 50.

In a linear system, like the assembly 10 of the present invention, a series of gears or levers could move the rail during every reciprocation. In linear systems an external drive device, such as the actuators 44 and 46 can be used to move the rail device 22 on a regular interval independent of, or in coordination with, the object motion.

In systems where the object is subjected to high accelerations, the rolling elements are also subject to high accelerations. During these accelerations the lubrication can be thrown from the rolling elements leading to starved conditions which allow for metal to metal contact and subsequent premature wear. Also during high accelerations, the inertia of the rolling elements may prevent the element from rolling and instead skid on the race. This skidding causes premature wear on the contact surfaces, such as, for example, the linear bearings 26, 28, 30, and 32 and the race surfaces 60 and 62. When the linear rail, i.e. the rail device 22, is in motion before the object moves, the accelerations will be reduced. This prevents lubrication starvation and element skidding. The rolling elements of the linear bearings 26, 28, 30, and 32 will be re-lubricated and will relocate to a new position on all four races. For large or seldom moved objects, moving just the rail device 22 can be accomplished with a much smaller force and be performed at anytime.

Alluding to the above, the aforementioned operation can also be performed just prior to moving these objects to "warm up" the bearing system. This warm up can be figurative as meaning just moving the elements and lubrication prior to a move or it can be literal in extremely cold environments where moving the rail device 22 will generate some heat due to friction with stiff grease. This heat will tend to lower the viscosity of the lubrication immediately adjacent to the rolling elements the linear bearings 26, 28, 30, and 32 again reducing the stiction the object will encounter. In a hot environment, wherein the lubrication may, drain away from the rolling elements, moving the rail device 22 will redistribute the lubrication to the rolling elements of the linear bearings 26, 28, 30, and 32 without moving the load.

In all applications listed, the bearings can be ball bearings, roller bearings, needle bearings, tapered roller bearings, spherical roller bearings, or thrust bearings without limiting the scope of the present invention. The bearing elements can be balls, rollers, spherical rollers, tapered rollers, needle, or plain bearing elements, the effect is the same as long as the rail device 22 is moving fast enough to put the bearing system in a state of dynamic friction.

Moving the rail device 22, while the object/shaft remains stationary, prevents "false brinelling" and redistributes the lubricant in the bearings 26, 28, 30, and 32. The method of the present invention can be used with small amplitude reciprocating motions to prevent lubrication starvation and localized race wear. This method can also be used to alter bearing element accelerations thereby reducing lubrication starvation or ball/roller skidding during motion and to prevent "false brinelling" and redistribution of lubricant in the bearings that remain static for long periods of time.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A linear bearing assembly comprising;
   a housing comprises a base,
   a first rail device disposed in said housing and at least one first lower bearing unit having said first rail device disposed on and movable relative said at least one first lower bearing unit;
   a railing member cooperable with said first rail device through at least one upper bearing unit connected to said railing member, said railing member is linearly movable relative to said first rail device for impacting an object located beyond said housing or within said housing; and
   a second lower bearing unit connected to said housing and disposed about said first rail device, said railing member movable relative to said first rail device to redistribute lubricant in at least one of said at least one first lower bearing unit, a second lower bearing unit, and said at least one upper bearing unit to prevent deformation of said first rail device.

2. A linear bearing assembly as set forth in claim 1, including a pair of actuators connected to said first rail device and said railing member thereby moving said first rail device and said railing member relative to one another and said housing.

3. A linear bearing assembly as set forth in claim 1, wherein said first rail device is further defined by a pair of rails having a race surface with each of said pair of rails connected to one another to expose said race surfaces in opposite directions with one of said race surfaces slidably movable about and within said at least one upper bearing unit and the other of said race surfaces is movable about and within at least one of said at least one first bearing unit and said second bearing unit.

4. A linear bearing assembly as set forth in claim 1, wherein said railing member includes a shaft for impacting the object located at least beyond or within said housing.

5. A linear bearing assembly as set forth in claim 4, wherein said at least one upper bearing unit comprises at least two bearing units.

6. A linear bearing assembly as set forth in claim 1, wherein said housing is further defined by side walls extending from said base thereby defining a chamber to house said first rail devices and said railing member with said at least one upper bearing unit connected to said base.

7. A linear bearing assembly as set forth in claim 6, including a controller operably communicated with a pair of actuators connected to said first rail device and said railing member, said controller having a software programmed to signal said pair of actuators to selectively move said first rail device and said railing member relative to one another and said housing in one of simultaneous and separate modes.

8. A linear bearing assembly as set forth in claim 7, including a pair of limiters disposed in said side walls and extending therethrough to control distance of travel of said railing member thereby preventing said railing member to move beyond a predetermined distance of travel preprogrammed by said controller.

9. A linear bearing assembly adaptable to be installed in a housing comprising:

a first rail device disposed in said housing and at least one first lower bearing unit with said first rail device being disposed on and movable relative said at least one lower bearing unit;

a railing member cooperable with said first rail device through at least one upper bearing unit connected to said railing member, said railing member linearly movable relative said first rail device for impacting an object located at least beyond or within the housing; and a pair of actuators connected to said first rail device and said railing member to selectively move said first rail device and said railing member relative to one another and the housing in at least one of simultaneous and separate modes to redistribute lubricant in at least one of said at least one first lower bearing unit, a second lower bearing unit, and said at least one upper bearing unit to prevent deformation of at least one of said first rail device and said railing member.

10. A linear bearing assembly as set forth in claim 9, wherein said first rail device is further defined by a pair of rails having race surfaces with each of said pair of rails connected to one another to expose said race surfaces in opposite directions with one of said race surfaces slidably movable about and within said at least one upper bearing unit and the other of said race surfaces is movable about and within at least one of said at least one first lower bearing unit and said second lower bearing unit.

11. A linear bearing assembly as set forth in claim 10, wherein said railing member includes a shaft for impacting the object located at least beyond or within the housing.

12. A linear bearing assembly as set forth in claim 11, wherein said at least one upper bearing unit comprises at least two bearing units.

13. A linear bearing assembly as set forth in claim 11, including a controller operably communicated with said pair of actuators connected to said first rail device and said railing member, said controller having a software programmed to signal said pair of actuators to selectively move said first rail device and said railing member relative to one another and said housing.

* * * * *